July 14, 1942.   F. H. MUELLER ET AL   2,289,722
VALVE STRUCTURE
Filed March 19, 1941

Inventors:
Frank H. Mueller,
Walter J. Bowan,
By Cushman, Darby & Cushman
Attorneys.

Patented July 14, 1942

2,289,722

UNITED STATES PATENT OFFICE 2,289,722

VALVE STRUCTURE

Frank H. Mueller and Walter J. Bowan, Decatur, Ill., assignors to Mueller Co., Decatur, Ill., a corporation of Illinois Application March 19, 1941, Serial No. 384,198

2 Claims. (Cl. 251—97)

The present invention relates to valve structures and, more particularly, to ground key stops.

Important objects of the invention are to provide a valve which is fully sealed against leakage, and will be held seated by the line pressure, but can be readily released from a seized position for operation.

Other objects and advantages of the invention will be apparent from the following specification and drawing, wherein.

Figure 2:
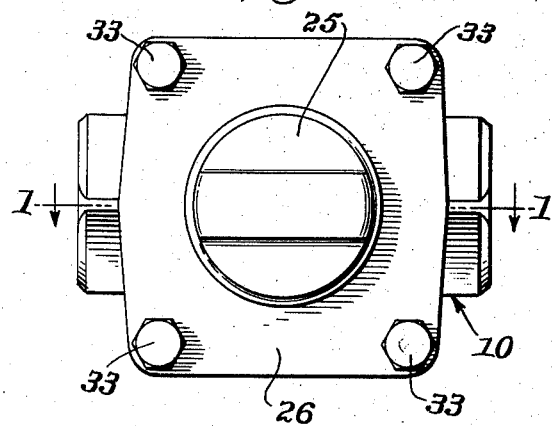
Figure 2 is a plan view of the valve.

The present invention is an improvement upon that disclosed in the application of Frank H. Mueller, for Valve structure, Serial No. 348,249, filed June 29, 1940.

The numeral 10 designates a valve body element or casing provided with a flow passageway 11 which is intersected by a preferably tapered valve seat 12. A tapered valve plug 13 is rotatably mounted in the seat 12 and is provided with a transverse or radial flow port 14.

The larger end of the plug 13 is within a pressure chamber 15 defined by an annular flange 16 on the valve body and a cap 17 threaded on the flange. A spring 18 extends between this end of the plug and the inner surface of the cap 17 so as to urge the plug toward the smaller end of the valve seat 12. The chamber 15 communicates with the flow line 11 through a small passage 19 and, assuming that passage 19 opens to the pressure side of the flow line, the plug will thereby be urged to a seated position both by spring 18 and the line pressure.

The above arrangement will insure that the plug will be held tightly seated at all times and in order to provide for release of the valve from tightly seated position when it is desired to rotate it, the smaller end of the plug and the adjacent operating member or handle are provided with the coacting anti-friction elements hereinafter described, which will impart to the plug a movement longitudinally or axially of its seat during the initial portion of each rotation of the plug. More particularly, the plug 13 includes an upstanding flange 20 at its smaller end which has a pair of diametrically opposite notches formed therein which receive a pin 21. On the outer side of the flange 20 the pin 21 carries at each end a tapered roller 22, the ends of the pin being flanged or peened to retain the rollers in place.

Figure 1:
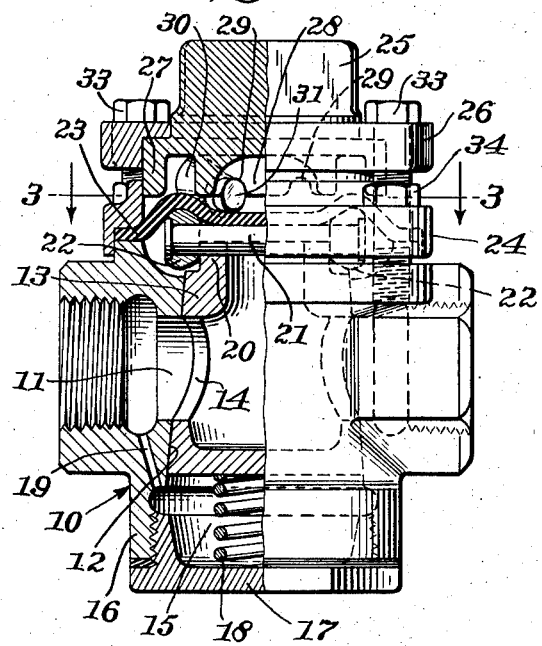
Figure 1 shows the valve partly in side elevation and partly in axial section, the sectional view being taken on a line corresponding to the line 1—1 of Figure 2.

The rollers 22 are engaged by a diaphragm 23 of suitable material such as rubber, the diaphragm being secured to the valve body by a collar 24 as hereinafter described. It will be observed from Figure 1 that the interior of the plug 13 is open to the inner surface of diaphragm 23 so that any pressure within the plug can act upon the diaphragm but the diaphragm nevertheless entirely seals this end of the valve body against escape of pressure.

An operating handle 25 is rotatably mounted within a plate 26 secured to the valve body as hereinafter described, handle 25 having an annular rib 27 extending inwardly from its periphery and, in addition, a second rib 28 spaced inwardly of skirt 27. The two ribs have pairs of aligned notches 29 therein in which rollers 30 are mounted by means of pin portions 31 extending from the ends of the rollers. It will be noted from Figure 3 that the rollers 30 are so mounted in the ribs 27 and 28 that a pair of rollers 30 will embrace, through the diaphragm 23, each roller 22 on the pin 21 carried by the plug.

Figure 3:
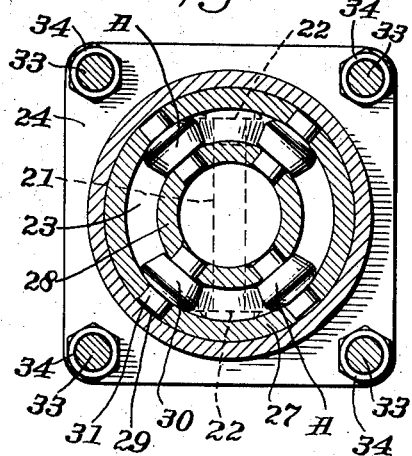
Figure 3 is a transverse section taken on the line 3—3 of Figure 1.

The plate 24 which bears upon the edges of the diaphragm 23 is of rectangular form, as best illustrated in Figure 3, and has an aperture in each corner through which a bolt 33 extends, the inner ends of each bolt being threaded into the valve body 10. Plate 24 is held tightly in engagement with diaphragm 23 by nuts 34 threaded on the bolts 33. The bolts 33 also extend through the plate 26 which surrounds the operating member or handle 25 with the heads of the bolts bearing upon the latter plate. It will be noted that the position of plate 26 with respect to the valve body can be determined by the extent to which the bolts 33 are threaded in the latter, while the sealing engagement of plate 24 with respect to the diaphragm 23 can be controlled by rotating the nuts 34 upon the bolts.

Figure 4:
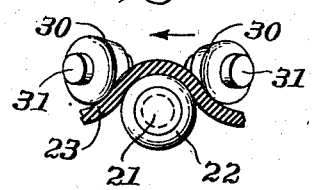
Figure 4 is a diagrammatic view showing the relationship of the plug releasing and operating elements.

By the above construction, either the spring 18 or the line pressure acting through port 19 in chamber 15, or both, will urge the valve plug 13 to a tightly seated position toward the smaller end of the valve body seat 12. When the operating member or handle 25 is turned, for example in the direction of the arrow of Figure 4, the pair of rollers designated A in Figure 3 will initially act through the diaphragm 23 upon the rollers 22 to urge the plug 13 downwardly against the action of spring 18 and the pressure in chamber 15 so as to release the plug from its tightly seated position. Continuance of the rotary movement of handle 25 will cause a circumferential force to be imparted to the rollers 22 to rotate the valve plug in the usual manner. Upon completion of the driving or rotating movement of handle 25, the valve plug will be moved axially of the valve body by the spring 18 and pressure in the chamber 15 so as to be again tightly seated. Upon reverse rotation of handle 25, the plug 13 will again be initially moved axially of the valve body and then rotated by the action of the other pair of rollers upon the rollers 22 carried by the plug.

The provision of coacting rollers which respectively engage through the diaphragm 23 insures that the diaphragm will not become worn and so that the diaphragm will more efficiently serve as a seal to enclose the plug in a manner which is not possible with packings or the like. A valve of this type, i. e., one operated through a diaphragm and so constructed that it can be normally held in sealed position but readily moved from its seat, is very economically manufactured because no fine machining is required, as is the case with valves which have a projecting handle requiring a packed seal.

The provision of a plug open to the diaphragm enables the line pressure to reach the diaphragm. Hence, as the plug is rotated, the pressure flattens out the diaphragm, removing pockets which may have been formed therein about the rollers and thereby easing operation.

The terminology used in the specification is for the purpose of description and not of limitation, the scope of the invention being set forth in the claims.

We claim:

1. In a valve structure, a valve body element provided with a flow passageway and a transversely extending seat, a valve element rotatable in the seat and provided with a flow port, a handle element rotatable in said valve body element at one end of said valve element, coacting rollers on said handle element and valve element to operatively connect the same and cause said valve element to move axially of the seat during its rotation, and a sealing diaphragm between said handle element and valve element.

2. In a valve structure, a valve body element provided with a flow passageway and a transversely extending seat, a valve element rotatable in the seat and provided with a flow port, a handle element rotatable in said valve body element at one end of said valve element, coacting rollers on said handle element and valve element to operatively connect the same and cause said valve element to move axially of the seat during its rotation, the rollers on the valve element being mounted on a pin extending transversely of the element, and the handle element including spaced annular ribs in which the rollers carried thereby are mounted.

FRANK H. MUELLER.
WALTER J. BOWAN.